Patented July 13, 1954

2,683,703

UNITED STATES PATENT OFFICE 2,683,703

POLYMERIC N-ACRYLYL MORPHOLINE

George E. Ham, Decatur, Ala., assignor to Monsanto Chemical Company, St. Louis, Mo., a corporation of Delaware No Drawing. Application May 6, 1953,
Serial No. 353,449

1 Claim. (Cl. 260—88.3)

This invention relates to a new chemical compound which has valuable and unusual properties, as are more fully described hereinafter. More particularly the invention relates to monomeric and polymeric compositions of matter made by reacting the acid chloride of acrylic acid with morpholine.

It has been discovered that acrylyl chloride and morpholine will react to form a new monomeric substance which may be represented by the following structural formula:

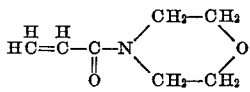

The new compositions may be prepared by reacting the said chloride of acrylic acid with morpholine in excess, or in morpholine together with pyridine or other tertiary amines. A solvent such as benzene may also be employed. Alternatively the new compound may be made by the reaction of morpholine with acrylic acid or with the esters of acrylic acid. When a solvent is employed it should preferably be a mutual solvent for the reagents, for example, benzene, toluene or xylene.

The new monomeric composition thus obtained is of value in that the said monomer is polymerizable but does not form copolymers with styrene or butadiene. The monomeric compound is water-soluble and the polymer of the new compound is soluble in the monomer and in acetone. The polymer is also water-soluble and is of particular utility as a sizing compound.

Further details of the preparation and use of the new composition are set forth with respect to the following examples:

Example 1

A reaction flask was charged with 100 g. of morpholine and 50 cc. of benzene. While vigorously agitating and cooling the contents of the flask, 22 g. of acrylyl chloride was added dropwise over a period of 3 hours. While the reagents were being combined a voluminous precipitate formed and the precipitated morpholine hydrochloride was removed by filtration. The benzene was removed at reduced pressure to obtain monomeric N-acrylyl morpholine.

Example 2

A sample of N-acrylyl morpholine from Example 1 was heated without a catalyst to a temperature over 200° C. The unpolymerized monomer was distilled overhead at 180° C. at 20 mm. until no more liquid could be volatilized, leaving a residual polymer which was completely soluble in water and acetone.

The present application is a continuation-in-part of my copending application Serial No. 11,870, filed February 27, 1948, now United States Patent 2,658,056.

Although the invention has been described with respect to specific embodiments, it is not intended that the details thereof shall be construed as limitations upon the scope of the invention except to the extent incorporated in the following claim.

What is claimed is:

Polymeric N-acrylyl morpholine.

No references cited.